United States Patent

White, Jr. et al.

(10) Patent No.: US 6,808,812 B2
(45) Date of Patent: Oct. 26, 2004

(54) ABRASION-RESISTANT COATING COMPOSITION, PROCESS FOR MAKING SUCH COATING COMPOSITION AND ARTICLE COATED THEREWITH

(75) Inventors: Sidney Shaw White, Jr., Seminole, FL (US); Hoa Thien Dang, Tampa, FL (US); Sheila Tatman, Seminole, FL (US)

(73) Assignee: Essilor International - Compagnie Generale d'Optique, Charenton Cedix (FR)

( * ) Notice: Subject to any disclaimer, the term of this patent is extended or adjusted under 35 U.S.C. 154(b) by 0 days.

(21) Appl. No.: 09/778,432

(22) Filed: Feb. 7, 2001

(65) Prior Publication Data

US 2001/0020080 A1 Sep. 6, 2001

Related U.S. Application Data

(62) Division of application No. 09/193,895, filed on Nov. 18, 1998, now Pat. No. 6,218,494.

(51) Int. Cl.⁷ .............................. B32B 9/04; B32B 27/30
(52) U.S. Cl. ...................... 428/447; 428/500; 428/702; 428/451
(58) Field of Search .................. 428/447, 451, 428/500, 702, 448; 406/287.13, 287.19

(56) References Cited

U.S. PATENT DOCUMENTS 4,207,357 A * 6/1980 Goossens .................... 427/162
4,405,679 A * 9/1983 Fujioka et al. .............. 428/216
5,360,834 A * 11/1994 Popall et al. ............. 430/270.1
5,849,414 A * 12/1998 Bier et al. ................... 428/412

* cited by examiner

*Primary Examiner*—Margaret G. Moore
*Assistant Examiner*—Marc S. Zimmer
(74) *Attorney, Agent, or Firm*—O'Keefe, Egan & Peterman, LLP

(57) ABSTRACT

The coating composition according to the invention comprises:

(A) a component which is the reaction product with oxalic acid of at least one organometallic compound of formula:

$$R^1_y\text{—}M(OR)_{x-y} \qquad (I)$$

wherein, M is a metal R is H or an alkyl radical, $R^1$ is a chelating ligand, x is the valency of the metal, y is an integer at least equal to 1 and x-y is at least equal to 1; and (B) at least one organoalkoxysilane of formula:

$$R^3_n\text{Si}(OR^2)_{4-n} \qquad (II)$$

wherein, $R^2$ is an alkyl radical, $R^3$ is an epoxidized alkyl group and n is an integer from 1 to 3 or a mixture of the organoalkoxysilane of formula (II) with an alkoxysilane of formula (II')

$$R'_{n'}\text{Si}(OR'')_{4-n'} \qquad (II')$$

wherein n' is an integer from 0 to 3,
R" is H, an alkyl radical or an alkoxyalkyl radical, and
R' is a vinyl, (meth)acryl, aromatic, cyclic or aliphatic alkyl radical.

11 Claims, No Drawings

ABRASION-RESISTANT COATING COMPOSITION, PROCESS FOR MAKING SUCH COATING COMPOSITION AND ARTICLE COATED THEREWITH

This application is a divisional application of application Ser. No. 09/193,895, filed Nov. 18, 1998, now U.S. Pat. No. 6,218,494.

BACKGROUND OF THE INVENTION

(1) Field of the Invention

The present invention relates in general to an abrasion-resistant coating composition, as well as to a process for making such a composition and articles, in particular optical articles such as ophtalmic lenses, comprising an abrasion-resistant coating including a cured layer of said abrasion-resistant coating composition.

(2) Description of the Prior Art

Numerous articles must be provided with abrasion-resistant or scratch resistant coatings since their sensitivity towards scratching does not allows them to be used in practice or allows only short periods of use.

This is in particular the case of optical articles such as ophtalmic lenses for which an abrasion-resistant or scratch-resistant surface is essential for maintaining a lens transparency over a period of time as long as possible.

The use of transparent plastic materials for making optical articles such as ophtalmic lenses is nowadays common pratice due to their unique lightness advantage compared to mineral glasses. Additionally, the use of such transparent plastic materials for making optical articles, in particular ophtalmic lenses, has allowed manufacturing articles having high refractive indices of 1.6 or more.

As a result of this achievement, it has been possible to manufacture lenses of lower thickness for an equivalent corrective power (optical power).

However, plastic materials in general, and more especially those employed in the manufacture of ophtalmic lenses, usually have poor mechanical surface characteristics with in particular low resistance to abrasion or scratching.

It is therefore a common practice to protect them with an abrasion-resistant or scratch-resistant coating.

Aqueous composition of organoalkoxisilanes and metal alkoxides have been proposed for making such abrasion and scratch-resistant coatings, as for example in U.S. Pat. Nos. 4,084,021 4,746,366; 4,754,012; 4,814,017 and 5,357,024.

Although these prior art compositions impart abrasion and scratch resistance to plastic substrates coated therewith there is still a need, in particular in the field of ophtalmic lenses, to formulate abrasion and scratch-resistant coating compositions exhibiting higher abrasion and scratch-resistance properties.

Futhermore, with the present possibility of obtaining transparent plastic material substrates having a wide range of refractive indices, for example, from 1.45 to 1.65 and more, it would be of major interest to formulate abrasion and scratch-resistant coating compositions which would exhibit refractive indices matching such a wide range of refractive indices and in particular high refractive indices.

Increasing the amount of metal alkoxides, such as titanium and zirconium alkoxide in the aqueous compositions of organoalkoxysilanes of prior art would increase the refractive indices of resulting cured coatings. However, high contents of metal alkoxides in such coating compositions lead to stability problems of the formulated compositions. In particular, the metal alkoxides, when used in relatively high amounts in the coating compositions, have a pronounced tendency to precipitate and agglomerate, resulting in an non-homogeneous coating.

SUMMARY OF THE INVENTION

Thus, the aim of the present invention is to formulate an abrasion or scratch-resistant coating composition which, while remedying to the drawbacks of the prior art compositions, also exhibits improved abrasion and scratch-resistant properties.

The present invention also concerns a process for making such abrasion or scratch-resistant coating compositions.

The present invention further concerns optical articles, in particular optical lenses, coated with an abrasion or scratch-resistant coating including a cured layer of the abrasion or scratch-resistant coating composition.

According to the invention, there is provided an abrasion or scratch-resistant coating composition which comprises (A) a component which is the reaction product with oxalic acid of at least one organometallic compound of formula:

$$R^1_y\text{—}M(OR)_{x-y} \qquad (I)$$

wherein, M is a metal, R is H or an alkyl radical, $R^1$ is a chelating ligand, x is the valency of the metal, y is an integer at least equal to 1 and x-y is at least equal to 1; and (B) at least one organoalkoxysilane of formula:

$$R^3_n Si(OR^2)_{4-n} \qquad (II)$$

wherein, $R^2$ is an alkyl radical, $R^3$ is an epoxidized monovalent organic radical and n is an integer from 1 to 3;

or a mixture of the organoalkoxysilane of formula (II) with an alkoxysilane of formula (II')

$$R'_{n'} Si(OR'')_{4-n'} \qquad (II')$$

wherein n' is an integer from 0 to 3, preferably from 0 to 2 (included), and

R" is H or an alkyl radical or alkoxyalkyl radical, preferably a $C_1$–$C_4$ alkyl radical and R' is a vinyl, (meth)acryl, aromatic, cyclic or aliphatic alkyl radical (preferably a $C_1$–$C_4$ alkyl radical).

Preferred alkoxysilanes of formula (II') are tetra (methoxy)silane, tetra(ethoxy)silane, methyltrimethoxy-silane, methyltriethoxysilane, dimethyldiethoxysilane, vinyldimethoxysilane, vinyltriethoxysilane, (meth) acryloxypropyltrimethoxysilane, (meth)-acryloxypropyl-triethoxysilane.

Preferably, component (B) comprises a major amount of the organoalkoxysilane of formula (II).

Optionally, the inventive coating composition may be a partial or total hydrolyzate of components (A) and (B).

DETAILED DESCRIPTION OF THE INVENTION AND PREFERRED EMBODIMENTS

In component (A) of the coating composition the metal is in general selected from the group consisting of Ti, Zr, Sc, Nb, V, Hf, Cr, Y, Al, Ge, Sn, Ta and W. Preferably the metal is Ti, Zr or Al and more preferably Ti or Zr.

R is preferably a $C_1$–$C_4$ alkyl radical such as ethyl, propyl and butyl.

$R^1$ is preferably a ligand produced from a compound of formula $L^1 COCH_2 COL^2$ or $L^3 COCH_2 COOL^4$, wherein $L^1$, $L^2$, $L^3$ and $L^4$, are $C_1$–$C_{10}$ alkyl groups, preferably $C_1$–$C_4$ alkyl groups, and more preferably methyl and ethyl groups.

Among the preferred ligands represented by $R^1$ there may be cited acetylacetonate, aliphatic aceto acetate, acetoacetones, acetylacetones methylacetoacetate, and ethylacetoacetate, being the most preferred.

Preferably also, in formula (I), y is equal to 2.

Among the most preferred component (A) there may be cited the reaction products of oxalic acid with titanium bis(acetyl acetonato)diisopropoxide, zirconium bis(acetylacetonato) diisopropoxide, titanium (acetylacetonato) triisopropoxide and zirconium (acetylacetonato) triisopropoxide.

Component (A) of the compositions of the invention may be prepared by (1) mixing an organometallic compound of formula $M(OR^2)_4$ (III), wherein M and $R^2$ are as defined above, with a ligand producing compound such as those defined above, at a temperature ranging from ambient temperature to 100° C. or more, and then (2) mixing to the reaction product of step (1) oxalic acid at ambient temperature.

Usually, a solvent is also used in step (2).

Among the appropriate solvents there may be cited methanol, ethanol, isopropanol, other aliphatic alcohols of low molecular weight, ethylacetate, methylethylketone and tetrahydropyrane.

Step (1) may last from 1 to 24 hours, depending upon the reacted compounds and the reaction temperature.

In step (1) the amount of ligand producing compound is determined in order to obtain a compound of formula (II) in which n is 1, 2 or 3, preferably 2.

Usually, there may be used 100 to 200 parts by weight of the ligand producing compound per 100 parts by weight of the starting tetraalkoxyde compound of formula (III).

Step (2) will typically last for 5 to 15 minutes.

The amount of oxalic acid used in step (2) usually ranges from 10 to 70, preferably 15 to 65 parts by weight based on 100 parts by weight of the starting tetraalkoxide compound of formula (III).

Nevertheless, an essential feature of the invention is that, in step (2), there is used at least an effective amount of oxalic acid, for example a molar ratio of 2 or more of oxalic acid based on compound of formula (I) and in particular titanium or zirconium compounds of formula (I).

The organoalkoxysilanes of component (B) are advantageously epoxidized organoalkoxysilanes of formula:

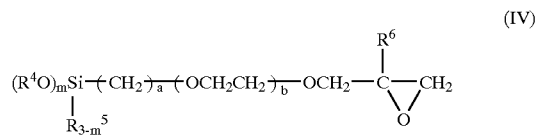

(IV)

in which $R^4$ is a $C_1$–$C_4$ alkyl or alkoxy alkyl group, $R^5$ is a $C_1$–$C_6$ alkyl or aryl group, $R^6$ is H or a methyl, m is 2 or 3, a is an integer from 1 to 6 and b is 0, 1 or 2.

Preferred epoxidized silanes are γ-glycidoxypropyltrimethoxysilane, γ-glycidoxypropyltriethoxysilane, γ-glycidoxypropyl methyldimethoxysilane, γ-glycidoxypropyl methyldiethoxysilane and γ-glycidoxyethoxypropylmethyl dimethoxysilane.

The most preferred silane is γ-glycidoxypropyltrimethoxysilane (GLYMO).

In the abrasion or scratch-resistant coating compositions of the invention, the organoalkoxysilanes may or may not be hydrolyzed. Hydrolysis of the silanes may be partial or complete. Advantageously the organoalkoxysilanes are completely hydrolyzed.

The abrasion-resistant coating compositions of the invention may further include other additives typically used in such abrasion or scratch-resistant coating compositions such as, surface-active agents, fillers, pigments, UV stabilizers and absorbers, antioxidants, cross-linking agents and hardening catalysts.

Any hardening catalyst known for their action in compositions similar to those of the present invention may be used, such as diamides, imidazoles, amines, organic sulfonic acids and their amine salts, alkali metal salts of carboxylic acid, and cyclic amidines.

Preferably, the composition of the invention contains a small amount of a surface-active agent.

The composition of the invention may also include mineral colloïdal fillers such as colloïdal silica or colloïdal fillers increasing the refractive index of the resulting cured layer, in particular to match as much as possible the refractive index of the substrate, specially when the substrate exhibits a high refractive index, in order to avoid optical defects such as interference fringes.

Such fillers may be oxides of Sb, Ti, Zr, Al, Ce, Sn, W and mixtures thereof, as well as mixed oxides (composite particles of these oxides), in particular Ti/Zr, Ti/Zr/Sn and Sn/W.

The amount of colloïdal filler in the composition of the invention may be up to 50% by weight of the dry extract of the composition.

The present invention is also directed to a process for making an abrasion-resistant coating composition which comprises:

(1) reacting in solution an organometallic compound of formula (I) with an effective amount of oxalic acid to obtain a solution of a reaction product of the organometallic compound with oxalic acid; and (2) adding with mixing to the solution of the reaction product of step (2), an organo-alkoxysilane of formula (II).

Preferably, the process of making the present composition further comprises:

(3) hydrolysing the mixture resulting from step (2).

In a further preferred embodiment of the process there is provided an additional step (4) of adding a surface-active agent either to the mixture resulting from step (2) or step (3).

Hydrolysing step (3) may be a partial or complete hydrolysis of the mixture. Hydrolysing medium may be water or a mixture of water and alcohol.

The amount of oxalic acid used in step (1) usually ranges from 10 to 70, preferably 15 to 65 parts by weight based on 100 parts by weight of corresponding tetraalkoxide compound of formula (III) from which compound of formula (I) is derived.

The oxalic acid addition and treatment is usually effected in a short period of time of 5 to 15 minutes, preferably about 10 minutes at room temperature.

The amount of organoalkoxysilanes of formula (II) in the present composition usually ranges from 50 to 90, preferably 60 to 80 parts by weight based on 100 parts by weight of component (A).

The addition and mixing of the organoalkoxysilane of formula (II) is generally effected at room temperature within a period of 1 to several hours, preferably about 2 hours.

When, the present composition is hydrolyzed, hydrolysis can be effected in the usual manner by addition of deionized water or a mixture of deionized water and alcohol. Hydrolysis step, as well known, may last for several hours, for example about 2 hours. Preferably the amount of water used is such that a complete hydrolysis is obtained.

The other additives such as the surface-active agent are then added and mixed in the usual manner.

The present invention further concerns a plastic substrate coated with a abrasion-resistant cured layer of a coating composition of the present invention.

Suitable substrates are any desired plastic materials, for example poly(meth)acrylates polythio(meth)acrylates, polystyrenes, polyurethanes and polycarbonates, and in particular poly(diethylene glycol bis-allyl carbonate) such as the material commercialized under the tradename CR-39® by PPG Industries.

The coating process may be any customary coating process, for example immersion or dip coating, flow-coating, spin-coating, roll-coating, spray-coating or brush-coating.

The coating is applied in coating thicknesses of, for example, 1 to 100 $\mu$m, preferably 1 to 20 $\mu$m and in particular 1 to 5 $\mu$m.

Curing of the compositions of the present invention is generally effected by heating at a temperature of 100 to 150° C. for 1 to several hours. Preferably, curing comprises a precuring step at a temperature of 50 to 70° C. for several minutes, usually 10 to 20 minutes, followed by a post-curing step at a temperature of 100 to 120° C. for at least one hour, usually 2 to 5 hours.

In a preferred embodiment of the present invention, the cured abrasion-resistant layer made of the coating composition of the present invention is used with a plastic substrate comprising an already deposited cured abrasion-resistant layer made of an abrasion-resistant coating composition. This abrasion resistant layer is preferably a (meth)acrylic layer or a polysiloxane layer. More preferably, the abrasion resistant layer is a polysiloxane layer obtained by curing a composition comprising a hydrolyzate of silane compounds containing an epoxy group and at least two alkoxy groups.

The preferred already deposited cured abrasion resistant layer comprises at least one hydrolyzate of silane compounds containing an epoxy group and at least two alkoxy groups, colloïdal silica and at least one aluminum chelate compound. Such abrasion-resistant coating compositions and their use for providing a cured abrasion-resistant layer on a plastic material substrate are disclosed in U.S. Pat. No. 4,211,823 which is incorporated by reference.

Most preferred silane compounds are the same as component (B) defined previously.

The already deposited cured abrasion-resistant layer may further contains a colloïdal filler or mixture of colloïdal fillers as mentioned above for the composition according to the invention.

Anti-abrasive coating compositions containing such colloïdal fillers are disclosed for example in patents and patent applications U.S. Pat. No. 4,571,365; EP-A-730,168 and EP-A-526,975.

As previously mentioned, the amount of colloïdal filler may be up to 50% by weight and, in the case of the polysiloxane underlayer in the range of from 30 to 50% by weight.

The cured abrasion-resistant layer of the abrasion-resistant coating composition according to the present invention is placed on top of the pre-deposited cured abrasion-resistant layer defined just above. The pre-deposited cured abrasion-resistant layer commonly has a thickness ranging from 1 to 20 $\mu$m and preferably 1 to 5 $\mu$m.

It has been found that, when used conjointly with a cured abrasion-resistant underlayer as described above, the cured abrasion-resistant layer according to the invention results in a plastic article coated with a hard-coat having an exceptional combination of abrasion-resistant properties as measured by Bayer test and Steel Wool test.

In preferred embodiments of the invention the substrate is an optical article and in particular an ophtalmic lens.

In the following examples, otherwise stated, all parts and percentages are by weight.

Bayer abrasion-resistance test and Steel Wool scratch-resistance test were performed as follows:

Bayer Abrasion Resistance Test

The abrasion resistance of a coating was examined by subjecting the coated lens to a fixed cycle of oscillating sand abrasion, similar to ASTM#F735-81 using approximately 500 grams of alumninium oxide ($Al_2O_3$) ZF Anlundum 152412 supplied by Specialty Ceramic Grains (former Norton Materials)/New Bond Street, PO Box 15137 Worcester, Mass. 01615-00137. The haze before and after abrasion was measured using a Pacific Scientific Hazemeter XL-211.

The change in the haze measurement before and after abrasion of the uncoated and coated lenses was tested. The ratio of the uncoated lens haze measurement to the coated lens haze measurement determines the performance of the test lens. The higher the ratio, the better the performance of the coating. Results of at least 3 test lenses are averaged for a final ratio.

Steel Wool Scratch Resistance Test

The "cutting" scratch resistance of the coatings was examined by subjecting the coated lens to abrasion similar to that described in U.S. Pat. No. 4,084,021. The device described in the patent was modified to rock the sample in an arch equivalent to a 600 diopter radius, which matches the front curve of the test speciments. "000" steel wool was used with the grain parallel to the rocking motion. The amount of abrasion was quantified by measuring the transmitted light haze of the abraded specimen, before and after abrasion, as described in the Bayer Abrasion Resistance Test. The change in haze is reported in the results table. A low change in haze indicates a high performance of the coating.

EXAMPLE 1

40 g of titanium tetraisopropoxide were mixed with 80 g of ethyl aceto acetate and heated at 90–100° C. under nitrogen blanket for two hours. A mixture of 12.7 g of oxalic acid and 50 g of ethanol was then added to the above mixture and mixed for 10 minutes. Thereafter, 50 g of glycidoxypropyltrimethoxysilane (GLYMO) were added and mixed for 2 hours. A mixture of 75 g of deionized water and 50 g of ethanol was added and mixed for 2 hours. 100 g of diacetone alcohol was then added. Finally, 0.4 g of a surface-active agent was added and mixed.

The resulting coating composition was applied by dip coating on a CR-39® lens substrate, precured for 15 minutes at 60° C. and postcured for 4 hours at 110° C.

The refractive index of the cured abrasion resistant layer was calculated to be 1.57.

The results of the Bayer and Steel Wool tests are reported in Table I.

As shown by the results in Table I, the cured abrasion-resistant layer of the composition according to the invention exhibits exceptionally high Bayer values.

EXAMPLE 2

40 g of titanium tetraisopropoxide were mixed with 40 g of ethyl aceto acetate for 24 hours at room temperature. A mixture of 12.7 g of oxalic acid and 50 g of ethanol was then added to the above mixture and mixed for 10 minutes. Thereafter, 50 g GLYMO were added and mixed for 2 hours. A mixture of 75 g of deionized water and 50 g of ethanol was further added and mixed for 2 hours. 100 g of diacetone alcohol were added. Finally, 0.4 g of a surface-active agent were added and mixed.

The resulting coating composition was applied by dip coating on a CR-39® lens substrate, precured for 15 minutes at 60° C. and postcured for 4 hours at 110° C.

The calculated refractive index was 1.57.

The results of the Bayer and Steel Wool tests are reported in Table I.

As shown by the results in Table I, the resulting cured abrasion-resistant layer exhibits exceptionally high Bayer values.

EXAMPLE 3

40 g of titanium tetraisopropoxide were mixed with 40 g of ethyl aceto acetate for 24 hours at room temperature. A mixture of 12.7 g of oxalic acid and 50 g of ethanol was added to the above mixture and mixed for 10 minutes. 50 g of GLYMO were added and mixed 2 hours. A mixture of 75 g of deionized water and 50 g of ethanol was added and mixed for 2 hours. 100 g of diacetone alcohol were added. Finally, 0.4 g of surface-active agent was added and mixed.

This abrasion-resistant coating composition was then applied by dip coating onto a hard coat layer formed on a CR-39® lens substrate, precured 15 minutes at 60° C. and postcured for 4 hours at 110° C.

The hard coat layer was a cured layer resulting from curing of an abrasion-resistant coating composition according to U.S. Pat. No. 4,211,823 comprising basically, in percent by weight:

| | |
|---|---|
| GLYMO | 22.2 |
| 0.1 N HCl | 5.1 |
| Nalco 1034A Aqueous Colloidal Silica (34 weight % dry extract) | 31.6 |
| Solvent | 39.5 |
| and a catalytic amount of (Aluminum acetylacetonate) | |

The remaining being usual surface-active agent and optical additives.

The results of the Bayer and steel wool tests are reported in Table I.

These results show that there is obtained exceptional good balance between the Bayer and the Steel Wool tests results.

EXAMPLE 4

40 g of titanium tetraisopropoxide were mixed with 40 g of ethyl aceto acetate for 24 hours at room temperature. A mixture of 12.7 g of oxalic acid and 50 g of ethanol was added to the above mixture and mixed for 10 minutes. 50 g of GLYMO were added and mixed 2 hours. 200 g of ethanol were added. Finally, 0.4 g of surface-active agent was added and mixed. This coating composition was applied by dip coating onto a CR-39® lens substrate, precured for 15 minutes at 60° C. and postcured for 4 hours at 110° C.

Calculated refractive index was 1.57. The results of the Bayer and Steel Wool tests are reported in Table I.

These results show that a good balance in Bayer and Steel Wool abrasion-resistance tests is obtained even when the composition is not hydrolyzed with addition of water.

EXAMPLE 5

65 g of commercially available titanium chelate Dupont Tyzor AA® of the formula $[CH_3COCH_2COCH_3]_2Ti[OCH(CH_3)_2]_2$ were mixed with 60 g of ethanol and 12.7 g of oxalic acid for 10 minutes. 50 g of GLYMO were added and mixed for 2 hours. Next, a solution of 75 g of deionized water and 128 g of ethanol was added and mixed for 2 hours. 50 g of diacetone alcohol were added and finally 0.3 g of surface-active agent was added and mixed. This coating composition was applied by dip coating onto a CR-39® lens substrate, precured for 15 minutes at 60° C. and postcured for 4 hours at 110° C. Calculated refractive index was 1.57.

The results of the Bayer and Steel Wool tests are reported in Table I.

EXAMPLE 6

65 g of Dupont Tyzor AA® were mixed with 60 g of ethanol and 12.7 g of oxalic acid for 10 minutes. 50 g of glycidoxypropyltrimethoxysilane were added and mixed for 2 hours. 128 g of ethanol and 50 g of diacetone alcohol were added and finally 0.3 g of surface-active agent was added and mixed. This coating composition was applied by dip coating onto a CR-39® lens substrate, precured for 15 minutes at 60° C. and postcured for 4 hours at 110° C. Calculated refractive index was 1.57.

The results of the Bayer and Steel Wool tests are reported in Table I.

EXAMPLE 7

40 g of titanium tetraisopropoxide were mixed with 40 g of ethyl aceto acetate for 24 hours at room temperature. A mixture of 25.4 g of oxalic acid and 70 g of ethanol was added to the above mixture and mixed for 10 minutes. 50 g of glycidoxypropyltrimethoxysilane were added and mixed for 2 hours. 100 g of ethanol and 75 g of deionized water were added and mixed for 2 hours. 50 g of diacetone alcohol were added and finally 0.4 g of surface-active agent was added and mixed. This coating composition was applied by dip coating onto a CR-39® lens substrate, precured for 15 minutes at 60° C. and postcured for 4 hours at 110° C. Calculated refractive index was 1.55.

The results of the Bayer and Steel Wool tests are reported in Table I.

EXAMPLE 8

40 g of titanium tetraisopropoxide were mixed with 40 g of ethyl aceto acetate for 24 hours at room temperature. A mixture of 6.3 g of oxalic acid and 70 g of ethanol was added to the above mixture and mixed for 10 minutes. 50 g of glycidoxypropyltrimethoxysilane were added and mixed for 2 hours. 100 g of ethanol and 75 g of deionized water were added and mixed for 2 hours. 50 g of diacetone alcohol were added and finally 0.4 g of surface-active agent was added and mixed. This coating composition was applied by dip coating onto a CR-39® lens substrate, precured for 15 minutes at 60° C. and postcured for 4 hours at 110° C. Calculated refractive index was 1.58.

The results of the Bayer and Steel Wool tests are reported in Table I.

COMPARATIVE EXAMPLE A 40 g of titanium tetraisopropoxide were mixed with 40 g of ethyl aceto acetate for 24 hours at room temperature. A mixture of 18.2 g of itaconic acid and 50 g of ethanol was added to the above mixture and mixed for 10 minutes. 50 g of glycidoxypropyl- trimethoxysilane were added and mixed for 2 hours. 50 g of ethanol and 75 g of deionized water were added and mixed for 2 hours. 50 g of diacetone alcohol were added and finally 0.4 g of surface-active agent was added and mixed. This coating composition was applied by dip coating onto a CR-39® lens substrate, precured for 15 minutes at 60° C. and postcured for 4 hours at 110° C.

The results of the Bayer and Steel Wool tests are reported in Table I.

As shown by these results, this prior art composition results in an hard coat layer exhibiting much lower bayer values than the composition of the present invention.

COMPARATIVE EXAMPLE B 40 g of titanium tetraisopropoxide were mixed with 40 g of ethyl aceto acetate for 24 hours at room temperature. A mixture of 16.25 g of fumaric acid and 50 g of ethanol was added to the above mixture and mixed for 10 minutes. 50 g of GLYMO were added and mixed for 2 hours. 100 g of ethanol and 75 g of deionized water were added and mixed for 1 hour before the liquid gelled irreversibly.

COMPARATIVE EXAMPLE C 40 g of titanium tetraisopropoxide were mixed with 40 g of ethyl aceto acetate for 24 hours at room temperature. A mixture of 29.4 g of 1,2,4-benzenetricarboxylic acid and 50 g of ethanol was added to the above mixture and mixed for 10 minutes. 50 g of GLYMO were added and mixed for 2 hours. 50 g of ethanol and 75 g of deionized water were added and mixed for 2 hours. 50 g of diacetone alcohol were added and, finally, 0,4 g of surface-active agent was added and mixed. This coating composition was applied by dip coating onto a CR-39® lens substrate, precured for 15 minutes at 60° C. and postcured for 4 hours at 110° C.

The Bayer and Steel Wool abrasive tests values are reported in Table I. These results show that the Bayer test value is not acceptable.

TABLE I

| Example n° | BAYER | STEEL WOOL |
|---|---|---|
| 1 | 280.3 | 34.66 |
| 2 | 825.0 | 42.06 |
| 3 | 211.15 | 0.27 |
| 4 | 11.80 | 35.59 |
| 5 | 129.50 | 35.64 |
| 6 | 25.23 | 46.95 |
| 7 | 122.67 | 27.89 |
| 8 | 134.88 | 45.93 |
| (comparative) A | 2.10 | 8.36 |
| (comparative) C | 0.75 | 25.27 |

What is claimed is:

1. A plastic material having at least one face coated with a cured layer of an abrasion or scratch resistant coating composition comprising:

(A) a component which is the reaction product with oxalic acid of at least one organometallic compound of formula:

$$R^1_y\text{—}M(OR)_{x-y} \qquad (I)$$

wherein M is a metal, R is H or an alkyl radical, $R^1$ is a chelating ligand, x is the valency of the metal, y is an integer at least equal to 1 and x-y is at least equal to 1; and (B) at least one organoalkoxysilane of formula:

$$R^3_n\text{Si}(OR^2)_{4-n} \qquad (II)$$

wherein $R^2$ is an alkyl radical, $R^3$ is an epoxidized alkyl group and n is an integer from 1 to 3, or a mixture of the organoalkoxysilane of formula (II) with an alkoxysilane of formula (II')

$$R'_{n'}\text{Si}(OR'')_{4-n'} \qquad (II)$$

wherein n' is an integer from 0 to 3,

R" is H, an alkyl radical or an alkoxyalkyl radical, and

R' is a vinyl, (meth)acryl, aromatic, cyclic or aliphatic alkyl radical, wherein said cured layer of an abrasion or scratch resistant coating composition is deposited on top of a first abrasion-resistant coating comprising a polysiloxane cured material.

2. The plastic material substrate according to claim 1, wherein M is selected from Ti, Zr, Sc, Nb, V, Hf, Cr, Y, Al, Ge, Sn, Ta, and W.

3. The plastic material substrate according to claim 1, wherein $R^1$ is a ligand produced from a compound of formula $L^1COCH_2COL^2$ or $L^3COCH_2COOL^4$ wherein $L^1$, $L^2$, $L^3$, $L^4$ are $C_1$–$C_4$ lower alkyl groups.

4. The plastic material substrate according to claim 1, wherein the organoalkoxysilane has formula:

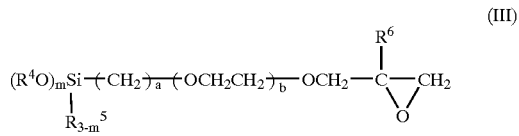

(III)

wherein $R^4$ is an alkyl or alkoxy alkyl group having 1 to 4 carbon atoms; $R^5$ is an alkyl or aryl group having 1 to 6 carbon atoms; $R^6$ is H or a methyl group, m is 2 or 3, a is an integer from 1 to 6 and b is 0, 1 or 2.

5. The plastic material substrate according to claim 4, wherein the organoalkoxysilane is selected from the group consisting of γ-glycidoxypropyltrimethoxysilane, γ-glycidoxypropyltriethoxysilane, γ-glycidoxypropyl-methyldimethoxysilane, γ-glycidoxypropylmethyldi-methoxysilane, and γ-glycidoxyethoxypropylmethyl-dimethoxysilane.

6. The plastic material substrate according to claim 1, wherein components (A) and (B) are further partially or fully hydrolyzed.

7. The plastic material substrate of claim 1, wherein the polysiloxane coating is a coating obtained from a hydrolyzate of a silane compound containing an epoxy group and at least two alkoxy groups directly linked to silicon.

8. The plastic material substrate according to claim 7, wherein the silane compound has formula:

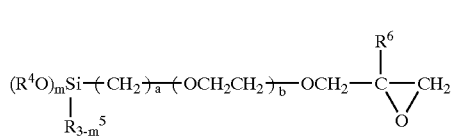 (IV)

wherein $R^4$ is an alkyl or alkoxy alkyl group having 1 to 4 carbon atoms; $R^5$ is an alkyl or aryl group having 1 to 6 carbon atoms; $R^6$ is H or a methyl group, m is 2 or 3, a is an integer from 1 to 6 and b is 0, 1 or 2.

9. An ophtalmic lens comprising a plastic material substrate as set forth in claim 1.

10. A plastic material having at least one face coated with a cured layer of an abrasion or scratch resistant coating composition comprising:

(C) a component which is the reaction product with oxalic acid of at least one organometallic compound of formula:

 (I)

wherein M is a metal, R is H or an alkyl radical, $R^1$ is a chelating ligand, x is the valency of the metal, y is an integer at least equal to 1 and x-y is at least equal to 1; and (D) at least one organoalkoxysilane of formula:

 (II)

wherein $R^2$ is an alkyl radical, $R^3$ is an epoxidized alkyl group and n is an integer from 1 to 3, or a mixture of the organoalkoxysilane of formula (II) with an alkoxysilane of formula (II')

 (II')

wherein n' is an integer from 0 to 3,

R" is H, an alkyl radical or an alkoxyalkyl radical, and

R' is a vinyl, (meth)acryl, aromatic, cyclic or aliphatic alkyl radical, wherein the cured abrasion-resistant layer of the composition as set forth in claim 1 is deposited on top of an intermediate abrasion-resistant coating comprising a (meth)acrylic or polysiloxane cured material, wherein the cured abrasion-resistant layer of the composition is deposited on top of a first cured layer of an abrasion-resistant composition including at least one hydrolyzate of silane compounds containing an epoxy group and at least two alkoxy groups, colloidal silica and at least one aluminum chelate compound.

11. An ophtalmic lens comprising a plastic material substrate as set forth in claim 10.

* * * * *